(12) United States Patent
Nevins

(10) Patent No.: US 7,938,373 B2
(45) Date of Patent: May 10, 2011

(54) VERTICAL SUPPORT STRUCTURE

(75) Inventor: Scott A. Nevins, Gettysburg, PA (US)

(73) Assignee: Evapco, Inc., Westminster, MD (US)

( * ) Notice: Subject to any disclaimer, the term of this patent is extended or adjusted under 35 U.S.C. 154(b) by 423 days.

(21) Appl. No.: 12/030,438

(22) Filed: Feb. 13, 2008

(65) Prior Publication Data

US 2009/0199996 A1   Aug. 13, 2009

(51) Int. Cl.
*A47B 96/00* (2006.01)
*A47K 1/00* (2006.01)
*A47K 5/00* (2006.01)
*E04G 5/06* (2006.01)
*F16L 3/08* (2006.01)
*F21V 35/00* (2006.01)
*F16M 11/00* (2006.01)

(52) U.S. Cl. ............... 248/225.11; 248/227.3; 248/200; 248/235; 248/248; 248/309.1; 211/189; 165/67; 165/68

(58) Field of Classification Search ............... 248/227.4, 248/225.11, 227.3, 225.21, 200, 235, 247, 248/309.1; 211/189, 191; 165/67–68
See application file for complete search history.

(56) References Cited

U.S. PATENT DOCUMENTS

| | | | | |
|---|---|---|---|---|
| 4,613,929 A | * | 9/1986 | Totten | 362/150 |
| 7,322,551 B2 | * | 1/2008 | Simonsen | 248/231.81 |
| 2005/0040301 A1 | * | 2/2005 | Walter | 248/200 |

* cited by examiner

*Primary Examiner* — Terrell McKinnon
*Assistant Examiner* — Christopher Garft
(74) *Attorney, Agent, or Firm* — Rader, Fishman & Grauer PLLC

(57) ABSTRACT

A vertical support structure includes a mounting plate and a support member. The support member extends vertically along a vertical axis and has a pair of vertically-elongated panel integrally connected together in a form of an angle iron to define a vertically-extending L-shaped channel between outside edges of the pair of panels. A top edge of the support member and a bottom edge of the support member are disposed vertically apart from and extend horizontally parallel to one another. The support member has a slot formed therethrough. The slot is disposed between the top and bottom edges and extends horizontally between the outside edges. The slot is sized to slidably receive the mounting plate and the mounting plate occupying the slot is connected to the support member such that the mounting plate projects perpendicularly from the support member and away from the L-shaped channel.

19 Claims, 16 Drawing Sheets

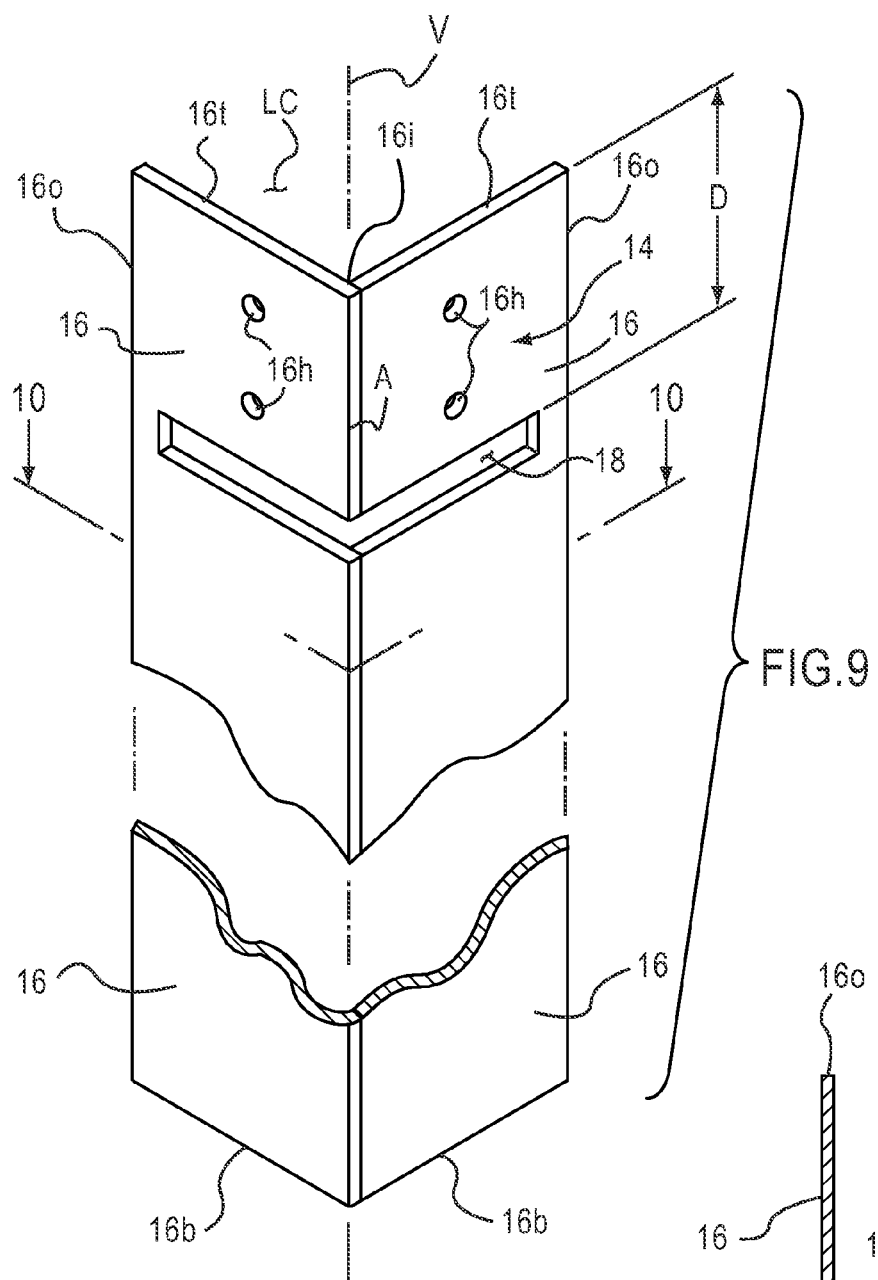
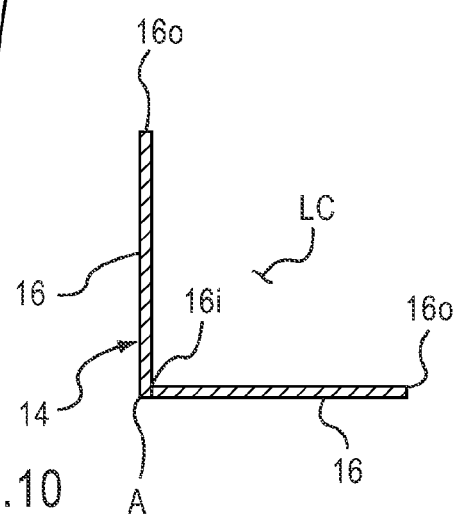

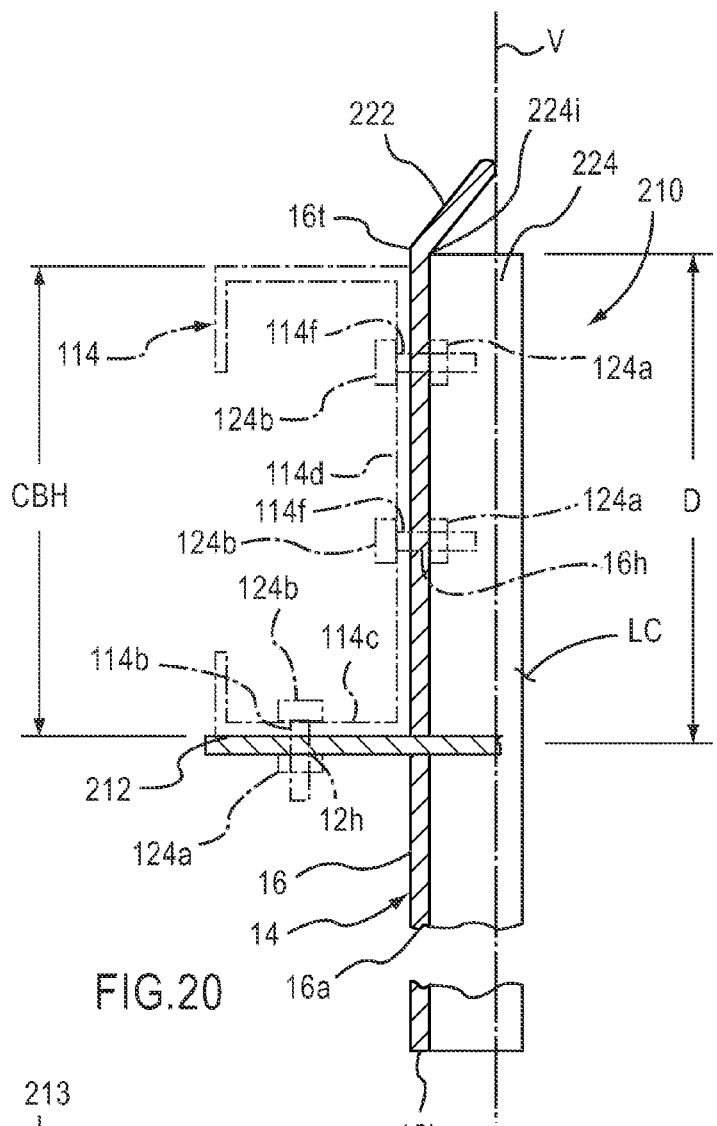
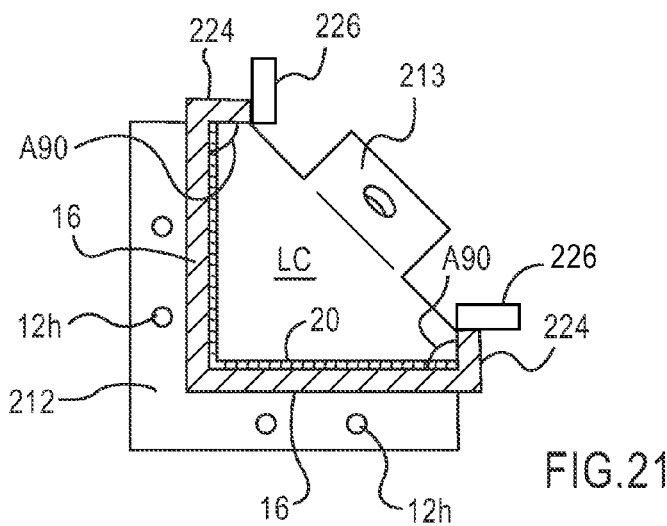

VERTICAL SUPPORT STRUCTURE

FIELD OF THE INVENTION

The present invention relates to a vertical support structure. More particularly, the present invention is directed to a vertical support structure adapted for use with a heat exchanger.

BACKGROUND OF THE INVENTION

A conventional heat exchanger 100 is described in U.S. Pat. No. 6,923,250 and illustrated in FIGS. 1A-4. The conventional heat exchanger 100 includes a cabinet 102 that houses an exhaust fan 104, a manifold 106, a direct heat exchanger medium 108 and a plurality of louver modules 110. As is commonly known in the art, the manifold 106 supplies water via spray nozzles 112 in a spray form to the direct heat exchanger medium 108 while the exhaust fan 104 draws air represented by the solid single-line arrows from outside the cabinet 102 through the louver modules 110. As the sprayed water flows downwardly along the direct heat exchanger medium 108 and as air is drawn upwardly by the exhaust fan 104 through the direct heat exchanger medium 108, heat is effectively exchanged between the downwardly flowing water and the upwardly moving air. After heat has been exchanged, the water drips into and accumulates in a water basin 113.

In FIG. 1A, the cabinet 102 includes a plurality of side walls 102a that house the direct heat exchanger medium 108. The plurality of side walls 102a rest on respective ones of cross-beams 114. As best shown in FIG. 1B and with reference to FIGS. 2-4, end portions 114a of the cross-beams 114 rest on a support assembly 116. Each cross-beam 114 is generally C-shaped and has a pair of facially-opposing flanges 114c and 114c, a web 114d disposed between and connected to the facially-opposing flanges 114c and 114c and a pair of ribs 114e and 114e extending from respective ones of the pair of flanges 114c and 114c. The support assembly 116 includes a vertical support beam 118 and a resting plate 120 having a plurality of resting plate holes 120a as best shown in FIG. 2. The resting plate 120 is connected to the top of the vertical support beam 118 by a weldment 122 in a manner that the resting plate holes 120a are positioned in front of the vertical support beam 118.

Cross-beam flange holes 114b are formed in respective ones of the flanges 114c of the cross-beams 114 that rest on the resting plate 120. When the cross-beams 114 are resting on the resting plate 120, the cross-beam flange holes 114b correspond with the resting plate holes 120a so that the cross-beams 114 are fastened to the resting plate 120 by conventional fasteners, such as nuts 124a and bolts 124b as best illustrated in FIGS. 1B and 3. Also, with reference to FIGS. 1B and 2, the cross-beams 114 when fastened to the resting plate 120 are connected together by a bracket 126 with conventional nuts 124a and bolts 124b. The bracket 126 has a plurality of bracket holes 126a. Cross-beam web holes 114f are formed in respective ones of the webs 114d. When the cross-beams 114 are fastened to the resting plate 120, the cross-beam web holes 114f and the bracket holes 126a correspond with each other for fastening the respective webs 114d to the bracket 126. The bracket 126 is typically used for mechanically lifting and lowering the cross-beams 114 and is usually not considered a part of the joint design.

However, as illustrated in an exaggerated manner in FIG. 4 only for the purpose of clearly and easily understanding a drawback in the prior art, specific load conditions, particularly during seismic events or in heavy wind conditions, exerted on the heat exchanger 100 can be problematic. During such seismic events or heavy wind conditions, a load, shown by way of example as an arrow, is exerted on the cabinet that, in turn, causes shear $F_S$ and tension $F_T$ forces along with a bending moment $M_B$ to develop and be exerted on the connected nuts and bolts 124a and 124b respectively fastening the flange 114c of the cross-beam 114 to the resting plate 120. The connected nuts and bolts 124a and 124b resist practically the entirety of such shear $F_S$ and tension $F_T$ forces along with the developed bending moment $M_B$. As illustrated in this exaggerated manner, the bolt 124b is subjected to the various forces and moments as the applied seismic or wind load is transmitted from the unit center of gravity, through the joint, to the base of the structure.

It would be beneficial to provide a vertical support structure that reduces the shear $F_S$ and tension $F_T$ forces along with the bending moment $M_B$ that is generated during seismic events and/or in heavy wind conditions on the nuts and bolts fastening the flange of the cross-beam to the resting plate by redistributing the forces & moments away from the nuts and bolts. It would also be beneficial to provide a vertical support structure that provides enhanced support for cross-beams in a heat exchanger. Additionally, it would be beneficial to provide a vertical support structure that would simplify mating of a top section of the heat exchanger to the bottom section thereof. The present invention provides these benefits.

OBJECTS AND SUMMARY OF THE INVENTION

It is an object of the invention to provide a vertical support structure that reduces the shear $F_S$ and tension $F_T$ forces along with the bending moment $M_B$ generated during seismic events and/or windy conditions on the nuts and bolts fastening the flange of the cross-beam to the resting plate.

It is another object of the invention to provide a vertical support structure that provides enhanced support for cross-beams in a heat exchanger.

Yet another object of the invention is to provide a vertical support structure that would simplify mating of a top section of the heat exchanger to the bottom section thereof.

Accordingly, a vertical support structure of the present invention is hereinafter described. A vertical support structure includes a mounting plate and a support member. The support member extends vertically along a vertical axis and has a pair of vertically-elongated panels. Each panel has an inside edge, an outside edge, a top edge and a bottom edge. The inside edge and the outside edge are disposed horizontally apart from and extend vertically parallel to one another. The top edge and the bottom edge are disposed vertically apart from and extend horizontally parallel to one another. The pair of panels are connected to each other along respective inside edges to form a generally L-shaped configuration as viewed in cross-section. The generally L-shaped configuration defines a vertically-extending apex and a vertically-extending L-shaped channel. The support member has a slot formed therethrough. The slot is disposed between respective ones of the top and bottom edges and extends horizontally between respective ones of the inside and outside edges and through the apex. The slot is sized to slidably receive the mounting plate and the mounting plate now occupying the slot is connected to the support member such that the mounting plate projects perpendicularly from the support member and away from the L-shaped channel.

More specifically, the vertical support structure of the present invention is adapted for connecting at least one cross-beam thereto. The at least one cross-beam has a flange and a web connected perpendicularly to the flange with the flange having at least one cross-beam flange hole formed therethrough and the web having at least one cross-beam web hole formed therethrough. The vertical support structure includes a plurality of fasteners, a support member and a mounting plate.

The support member is in a form of an angle iron to define the L-shaped channel. The mounting plate is connected to at least one panel between the top and bottom edges. The mounting plate has at least one mounting plate hole extending therethrough and the at least one panel has at least one panel hole formed therethrough. The at least one panel hole is disposed between the mounting plate and the top edge such that, when the at least one cross-beam rests on the mounting plate, the at least one panel hole and the at least one cross-beam web hole correspond to each other and the at least one mounting plate hole and the at least one cross-beam flange hole correspond to each other so that respective ones of the fasteners can extend therethough to connect the web to the at least one panel and to connect the flange to the mounting plate.

These objects and other advantages of the present invention will be better appreciated in view of the detailed description of the exemplary embodiments of the present invention with reference to the accompanying drawings, in which:

BRIEF DESCRIPTION OF THE DRAWINGS

FIG. 9 is a perspective view of the support member.

FIG. 10 is a cross-sectional view taken along crossing lines 10-10 in FIG. 9.

FIG. 20 is an enlarged partial cross-sectional view of the vertical support structure taken along line 20-20 in FIG. 14.

FIG. 21 is a cross-sectional view of the vertical support structure taken along lines 21-21 in FIG. 14.

DETAILED DESCRIPTION OF THE EXEMPLARY EMBODIMENTS

Hereinafter, embodiments of the present invention will be described with reference to the attached drawings. The structural components common to those of the prior art and the structural components common to respective embodiments of the present invention will be represented by the same symbols and repeated description thereof will be omitted.

Figure 1A:
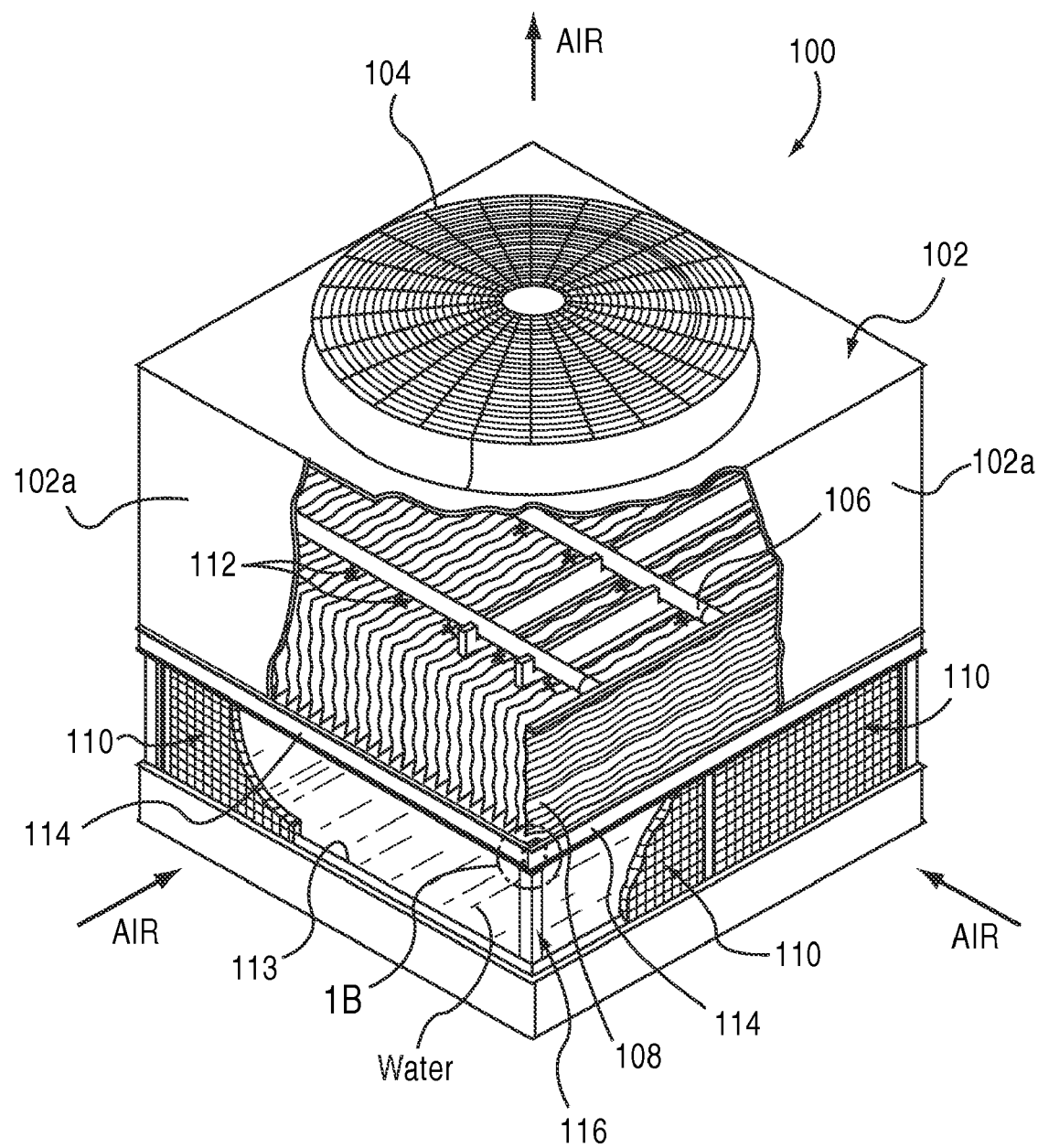
FIG. 1A is a perspective view of a conventional heat exchanger.
Figure 1B:
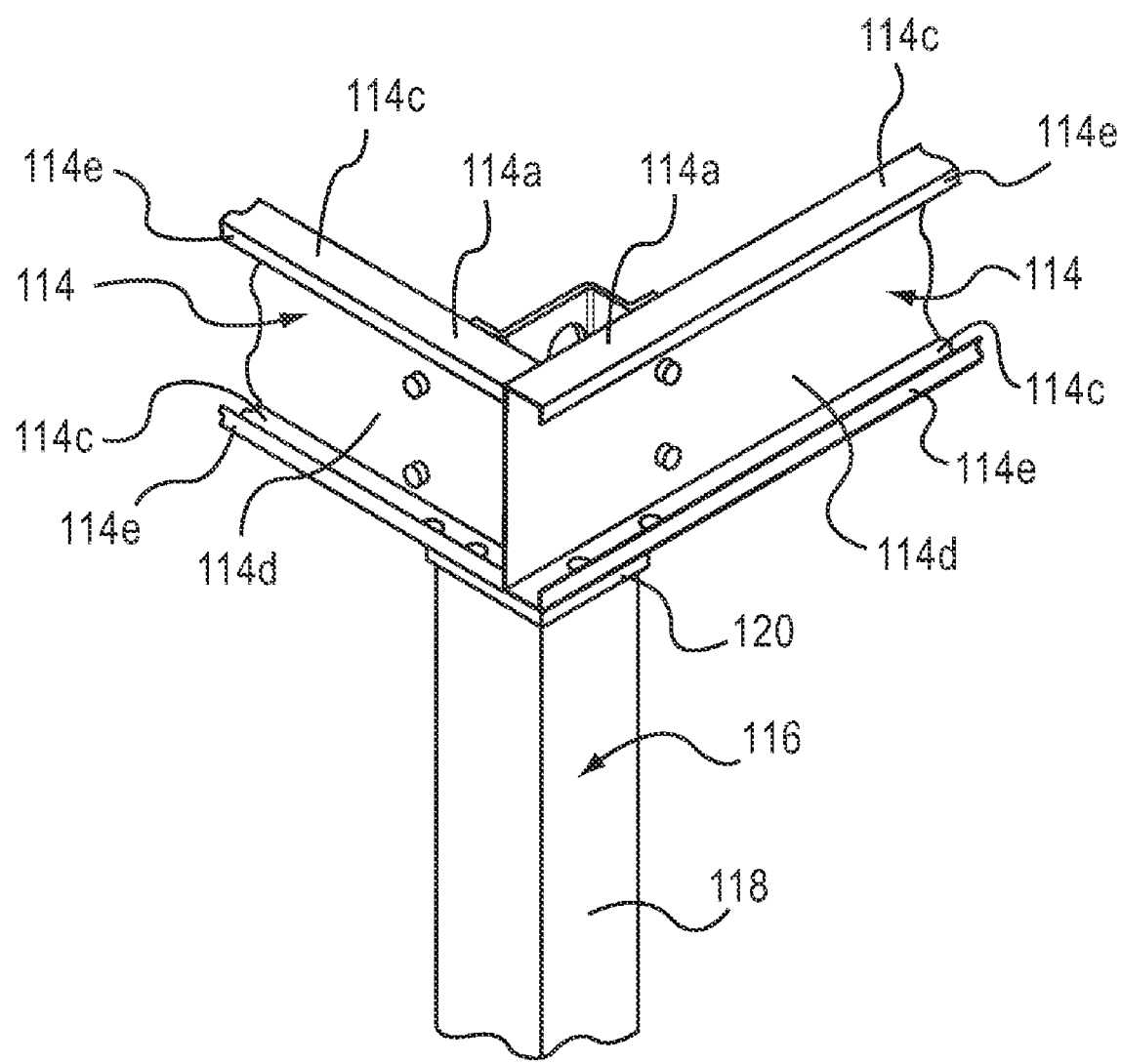
FIG. 1B is an enlarged partial perspective view of an arrangement of two conventional cross-beams supported by a conventional support assembly in the conventional heat exchanger in FIG. 1A.
Figure 2:
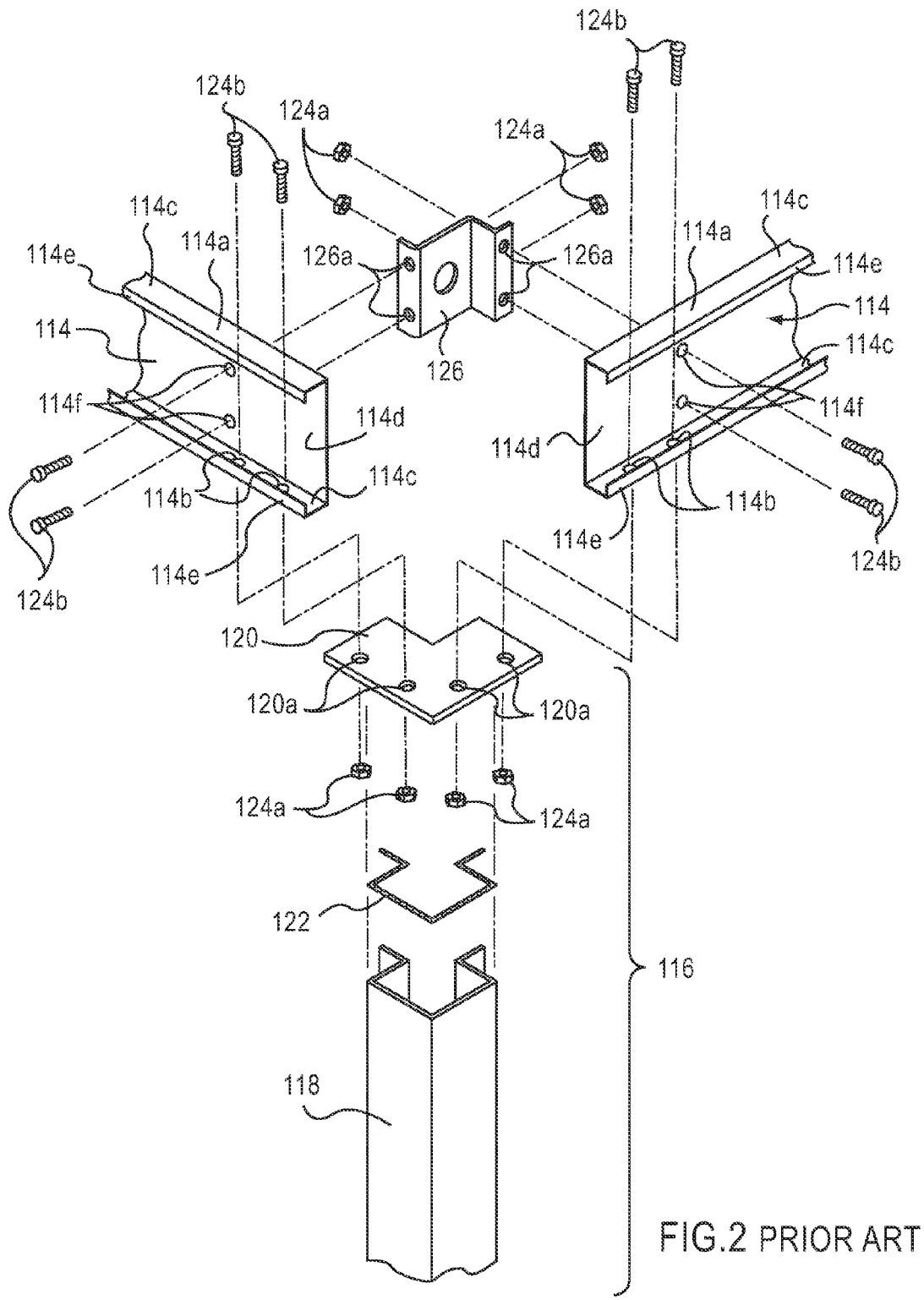
FIG. 2 is an exploded perspective view of the arrangement of conventional components shown in FIG. 1A.
Figure 3:
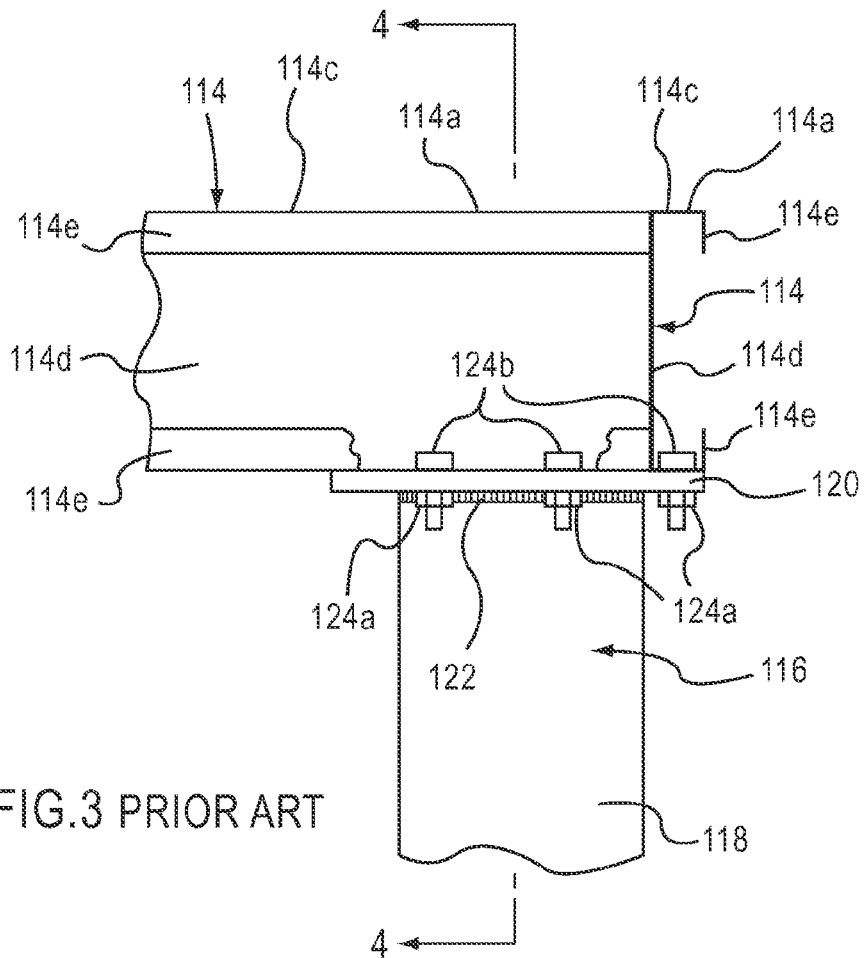
FIG. 3 is a front elevational view of the arrangement shown in FIGS. 1B and 2.
Figure 4:
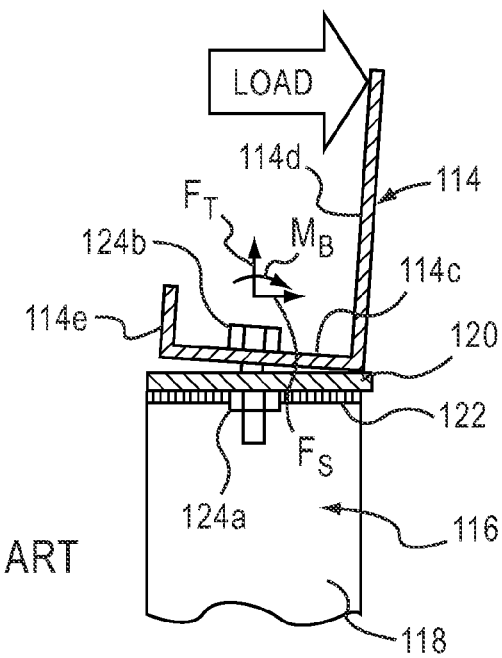
FIG. 4 is a side elevational view partially in cross-section taken along line 4-4 in FIG. 3.
Figure 5:
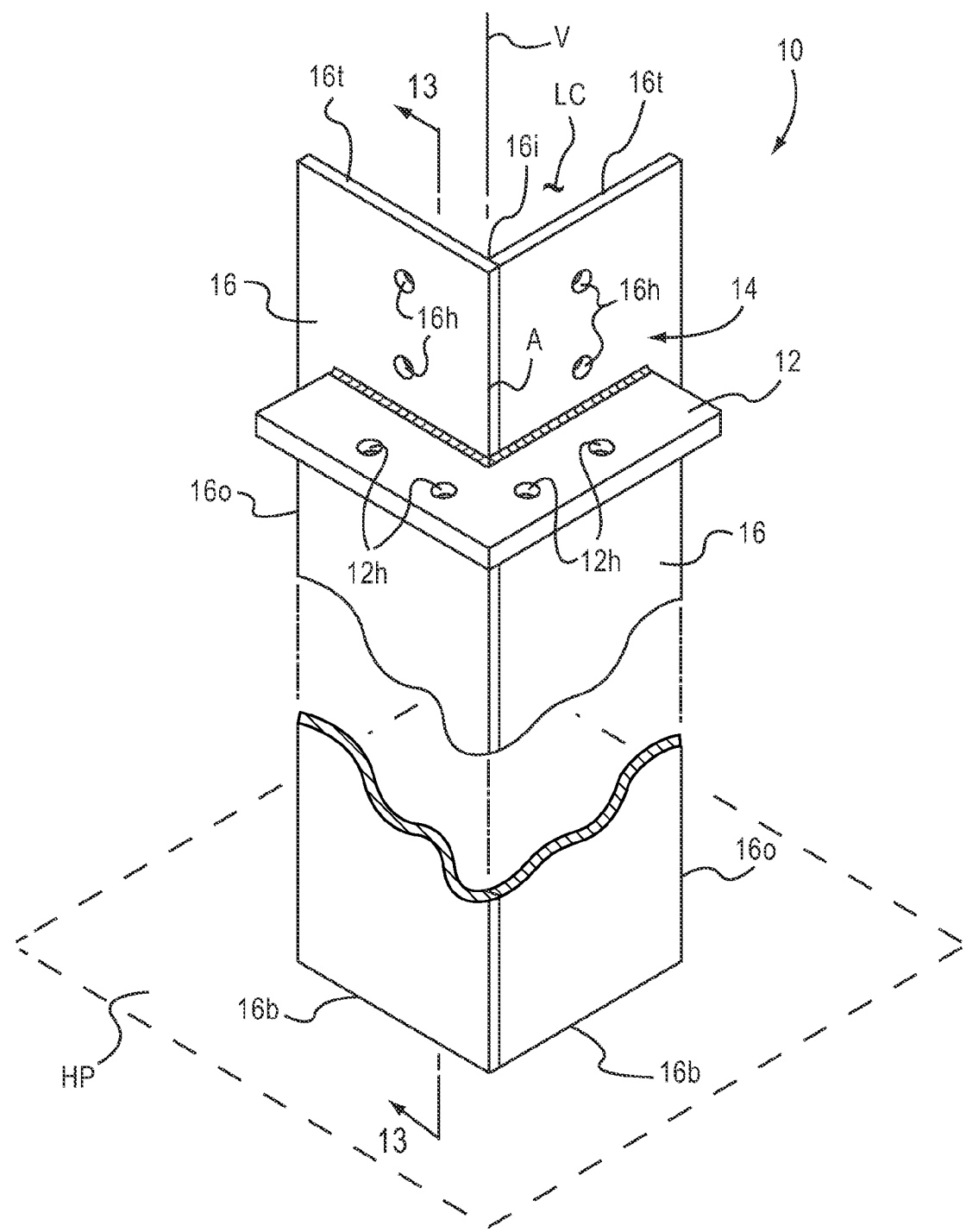
FIG. 5 is a perspective view of a first exemplary embodiment of a vertical support structure of the present invention.
Figure 6:
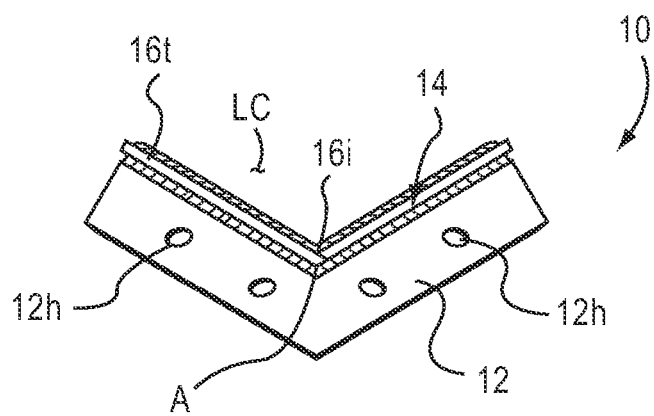
FIG. 6 is a top plan view of the vertical support structure in FIG. 5.
Figure 7:
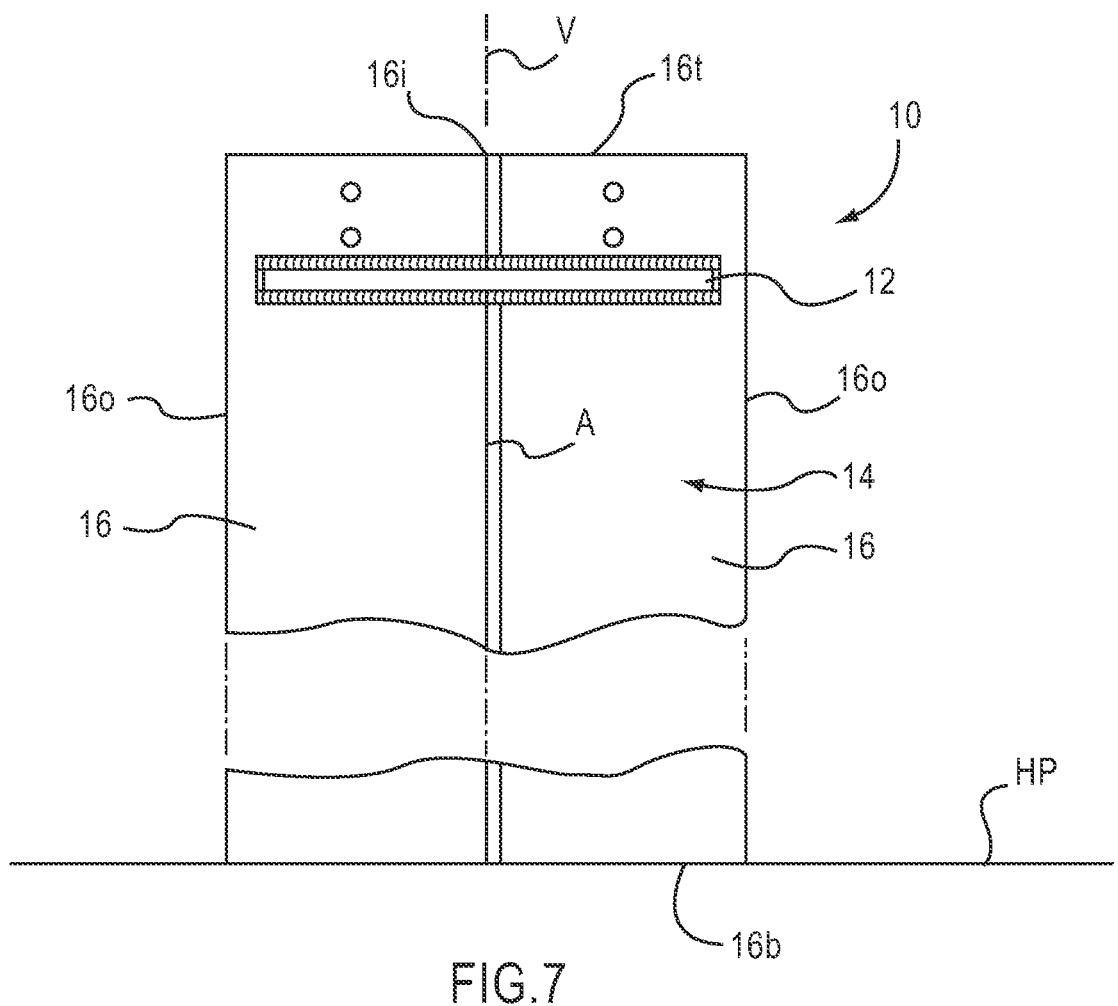
FIG. 7 is a front elevational view of the vertical support structure in FIG. 5.

A first exemplary embodiment of a vertical support structure 10 of the present invention is hereinafter described with reference to FIGS. 5-13. As best shown in FIGS. 5-7, the vertical support structure 10 of the present invention includes a mounting plate 12 and a support member 14. In FIG. 5, the support member 14 extends vertically along a vertical axis V. As shown in FIGS. 5 and 7, the vertical axis V extends perpendicularly to a horizontal plane HP.

Figure 8:
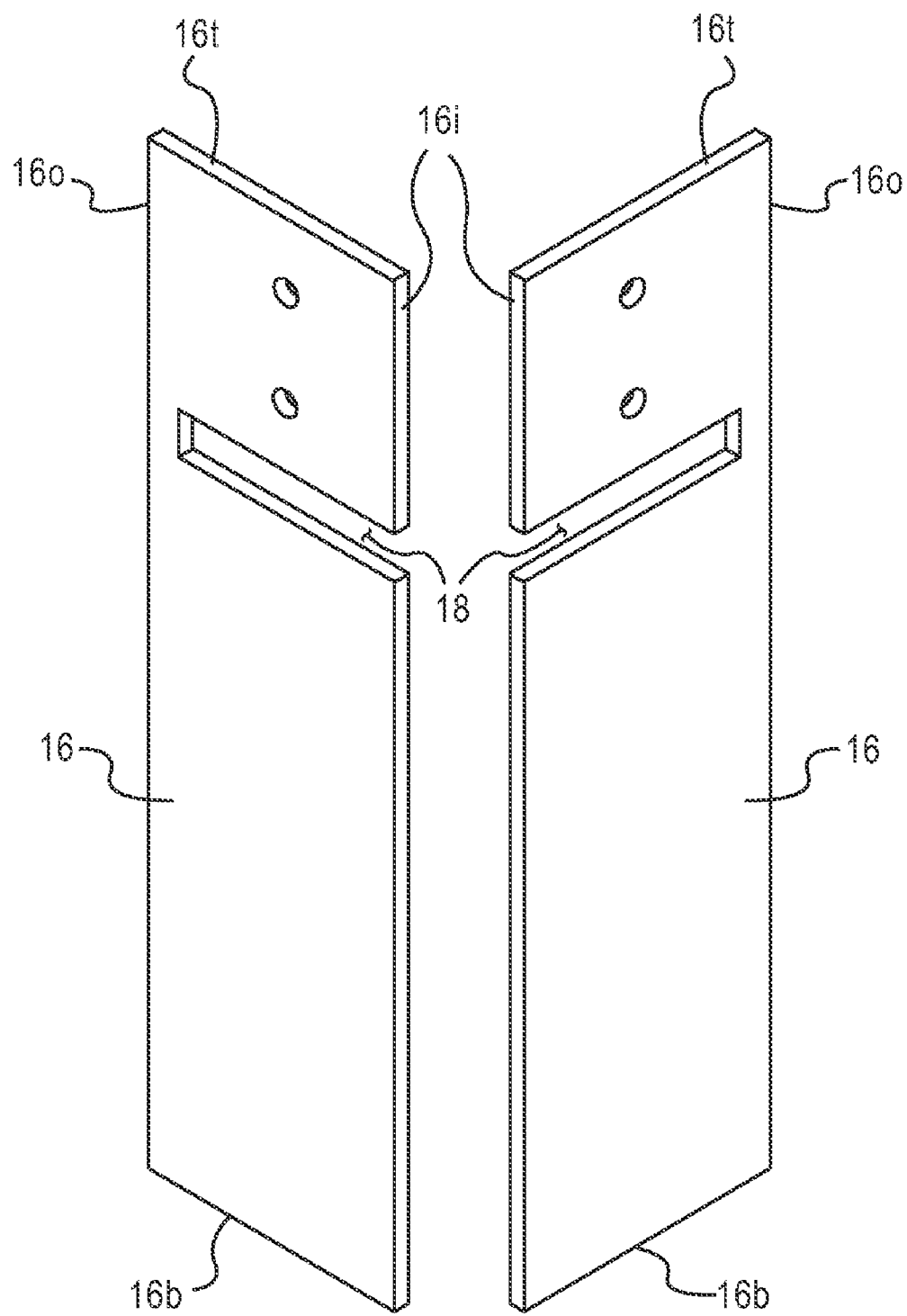
FIG. 8 is a perspective view of two individual panels separated from one another that, when connected along their inner vertical edges, form a support member.

As best shown in FIGS. 5, 7 and 8, the support member 14 has a pair of individual vertically-elongated panels 16. In FIG. 8, each panel 16 has an inside edge 16i, an outside edge 16o, a top edge 16t and a bottom edge 16b. The inside edge 16i and the outside edge 16o of each panel 16 is disposed horizontally apart from one another and extend vertically parallel to one another. The top edge 16t and the bottom edge 16b are disposed vertically apart from one another and extend horizontally parallel to one another. Although not by way of limitation but by example only, the pair of panels 16 are separated from one another as illustrated in FIG. 8. However, as shown in FIGS. 5-7 and 9, the pair of panels 16 are connected to each other along respective inside edges 16i to form a generally L-shaped configuration as viewed in cross-section in FIG. 10. In short, for the first exemplary embodiment of the present invention, the pair of panels 16 are connected to each other along respective inside edges 16i to form an integral construction. The pair of panels 16 are connected together in this fashion to define a vertically-extending apex A and a vertically-extending L-shaped channel LC.

Figure 13:
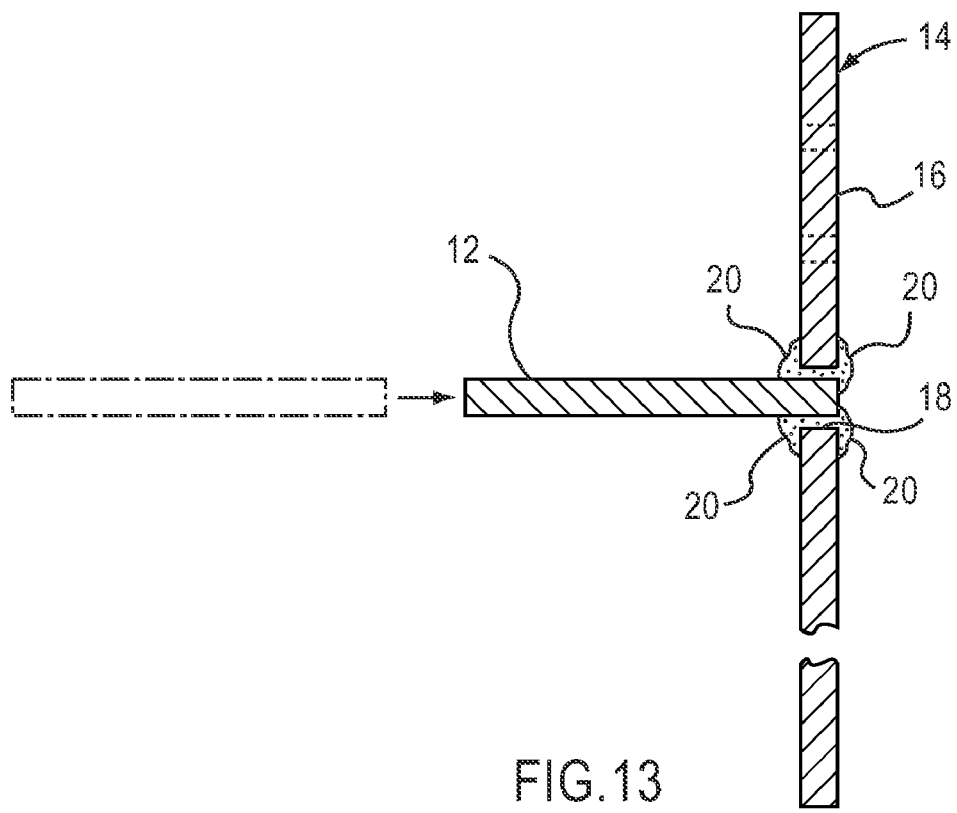
FIG. 13 is a partial cross-sectional view of the support member and the mounting plate taken along lines 13-13 in FIG. 5.
Figure 14:
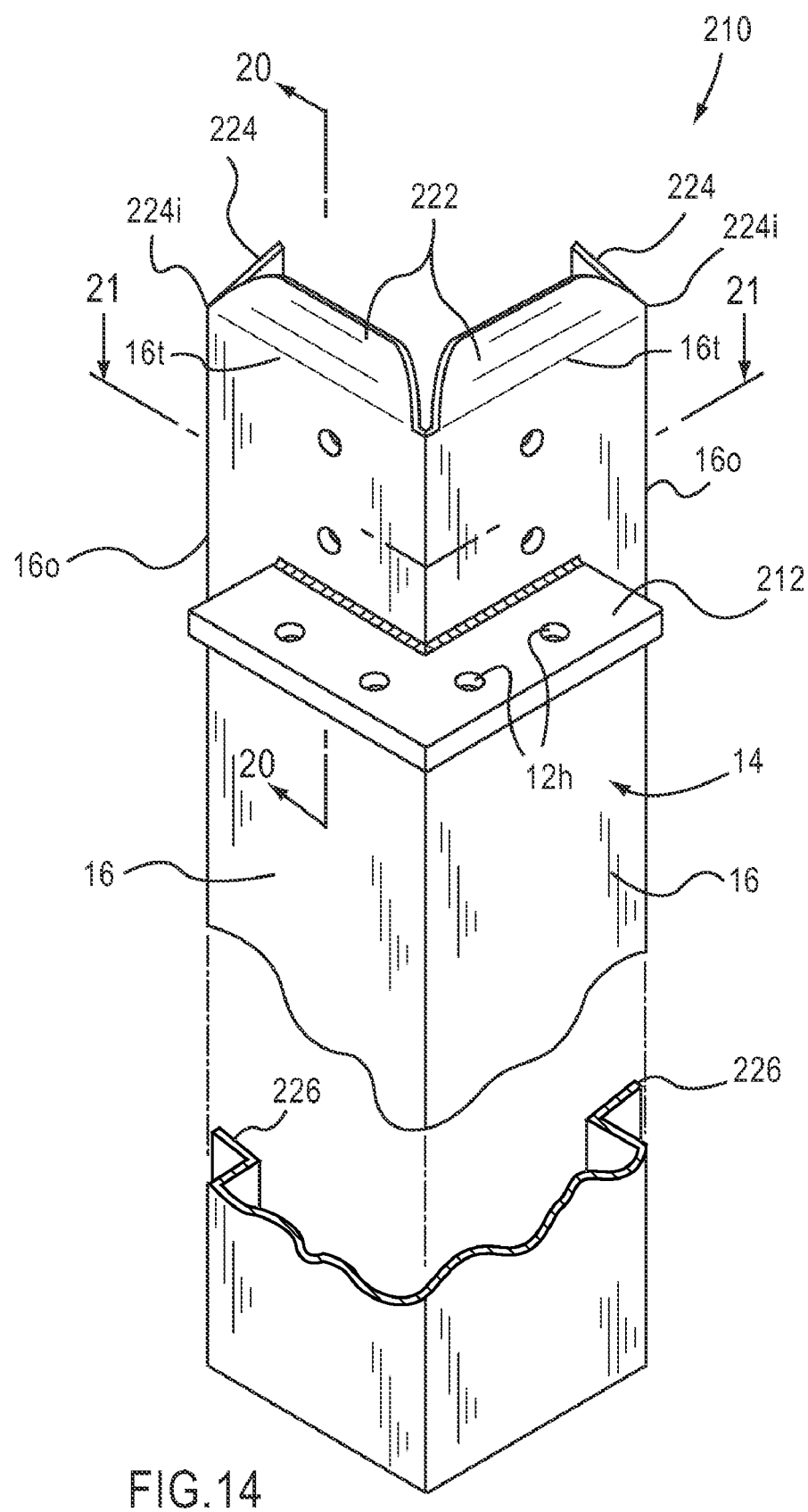
FIG. 14 is a perspective view of a second exemplary embodiment of the vertical support structure of the present invention.
Figure 15:
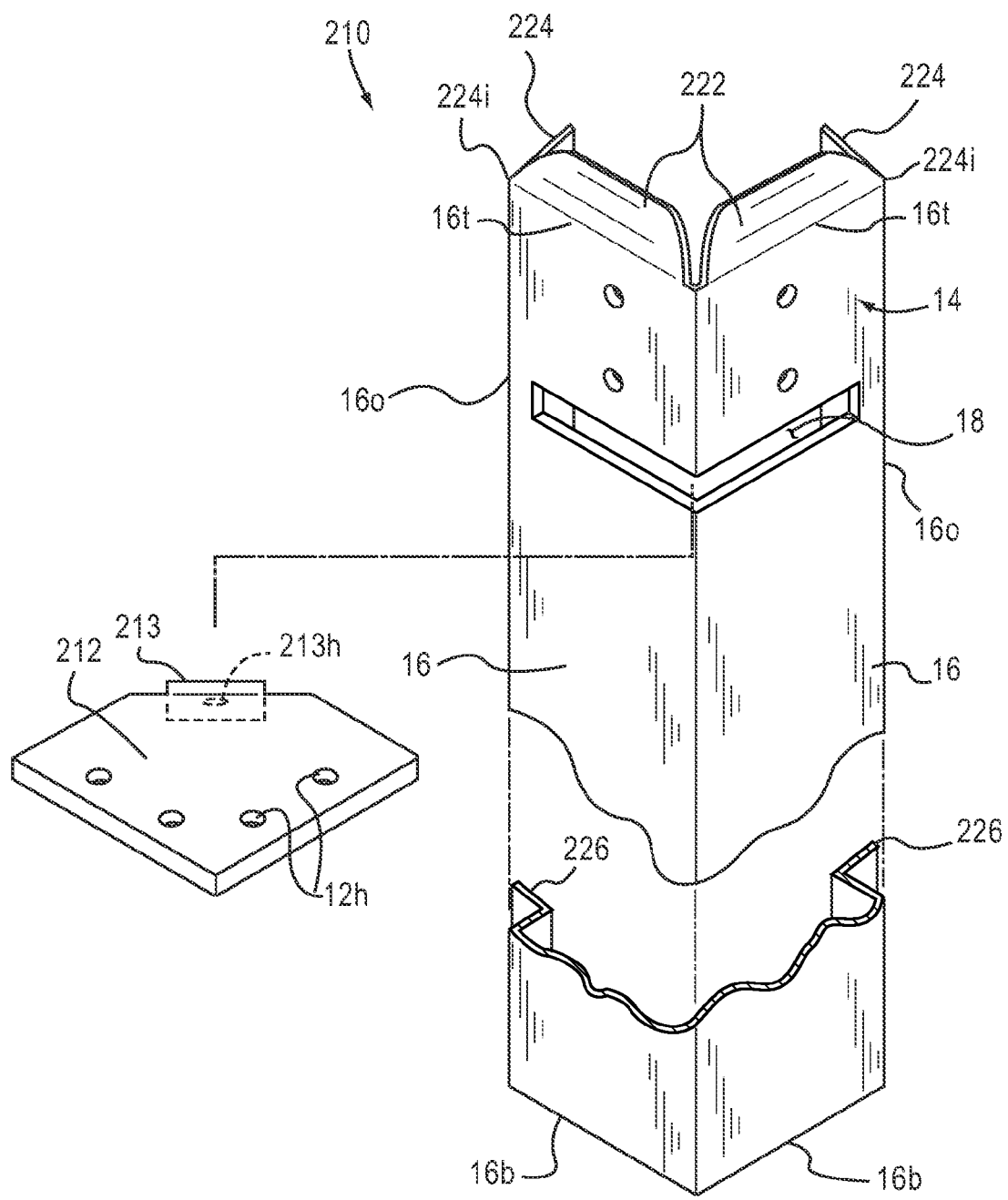
FIG. 15 is an exploded view of the vertical support structure in FIG. 14.
Figure 16:
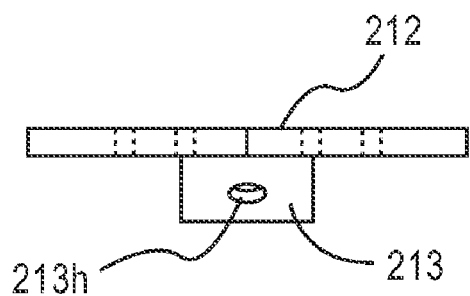
FIG. 16 is a front elevational view of a mounting plate of the vertical support structure in FIG. 14.
Figure 17:
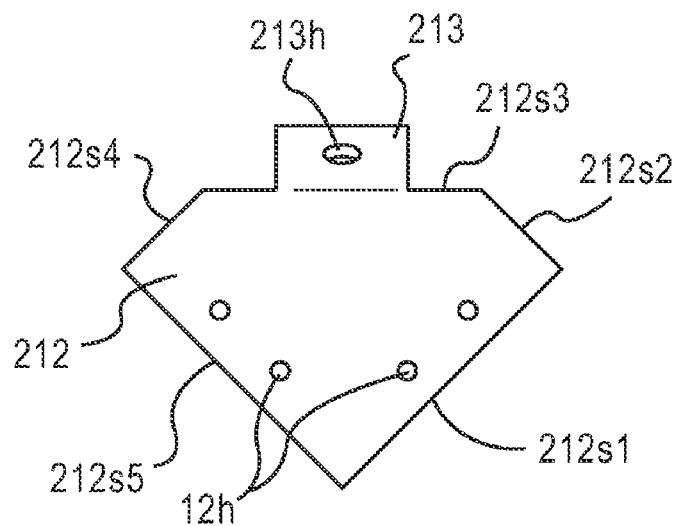
FIG. 17 is a top plan view of the mounting plate in FIG. 16.
Figure 18:
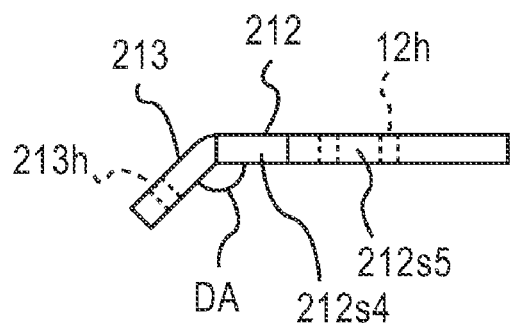
FIG. 18 is a side elevational view of the mounting plate in FIGS. 16 and 17.

As best illustrated in FIG. 9, the support member 14 has a slot 18 that is formed completely through the support member 14. Also, note that the slot 18 is disposed between respective ones of the top edges 16t and the bottom edges 16b and extends horizontally between respective ones of the inside edges 16i and outside edges 16o and through the apex A. As illustrated in FIG. 13, the slot 18 is sized to slidably receive the mounting plate 12. The mounting plate 12 now occupying the slot 18 is connected to the support member 14, for example, by weldments 20. A skilled artisan would appreciate that the 4 weldments 20 shown in FIG. 13 are not all necessary and that less than 4 weldments might be used to connect the mounting plate 12 to the support member 14. For the first exemplary embodiment of the present invention, at least one weldment 20 connects the mounting plate 12 in the slot 18 to the support member 14. The mounting plate 12 projects perpendicularly from the support member 14 and away from the L-shaped channel LC as shown in FIGS. 5 and 6.

Furthermore, it is preferred that the slot 18 is sized to slidably receive the mounting plate 12 in a close-fitting manner as illustrated in FIG. 13. Particularly with reference to FIG. 9, the slot 18 is disposed away from the top edges 16t at a distance D. It is considered that the slot 18 is disposed adjacent to the top edges 16t. Note that each panel 16 includes a pair of panel holes 16h that are vertically disposed apart from one another and are vertically disposed between the top edges 16t and the slot 18. However, a skilled artisan would appreciate that, for the first exemplary embodiment of the present invention, each panel 16 includes at least one panel hole 16h.

Figure 11:
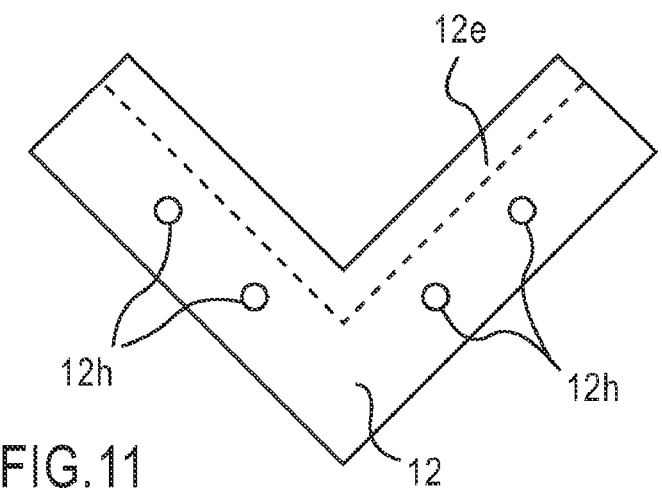
FIG. 11 is a top plan view of a mounting plate.
Figure 12:
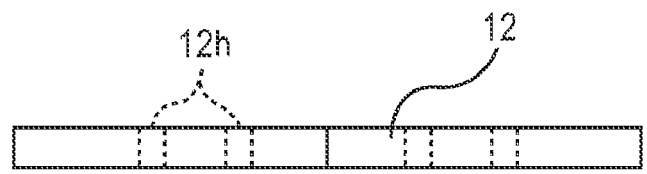
FIG. 12 is a front elevational view of the mounting plate shown in FIG. 11.

With reference to FIGS. 11 and 12, the mounting plate 12 is V-shaped as viewed in plan view. An imaginary inner V-shaped edge 12e drawn partially in phantom is sized to be received within the slot 18. Also, the mounting plate 12 also includes a plurality of mounting plate holes 12h although a skilled artisan would appreciate that the mounting plate 12 has at least one mounting plate hole 12h.

A second exemplary embodiment of a vertical support structure 210 of the present invention is generally introduced in FIGS. 14-21. The vertical support structure 210 is similar to the first exemplary embodiment of the vertical support structure 10 of the present invention and no further discussion of the similar features is deemed necessary.

As shown in FIGS. 15-18, a mounting plate 212 is shaped in a form of a polygon as viewed in plan view. Thus, the configuration of the mounting plate 212 has a plurality of serially-connected mounting plate sides 212s, particularly, 212s1, 212s2, 212s3, 212s4 and 212s5, forming a shape of the polygon (see FIGS. 15 and 17). Although not by way of limitation, a skilled artisan would appreciate that the pentagon shape is non-cyclic and non-equilateral. Although not by way of limitation but by way of example only, the mounting plate sides 212s1 and 212s5 are generally equal in length, the mounting plate sides 212s2 and 212s4 are generally equal in length and the mounting plate sides 212s1 and 212s5 are longer in length than the mounting plate sides 212s2 and 212s4. Further, the mounting plate side 212s3 might be larger or smaller in length than the mounting plate sides 212s2 and 2112s4.

Also, in FIGS. 15-18, the mounting plate 212 has a tab element 213 connected thereto. The tab element 213 extends along the mounting plate side 212s3. The tab element 213 is oriented at a downwardly angle DA from the mounting plate 212 angling outwardly towards the bottom edges 16b of the panels 16 of the vertical support structure 210. Further, the tab element 213 has a tab element hole 213h formed therethrough. A skilled artisan would appreciate that the tab element 213 is optional and not necessary to implement the present invention.

With reference to FIGS. 14, 15, 19 and 20, the vertical support structure 210 includes a pair of guide elements 222. Respective ones of the pair of guide elements 222 are integrally connected to respective ones of the top edges 16t of the panels 16 and extend upwardly and inwardly toward the L-shaped channel LC.

Figure 25:
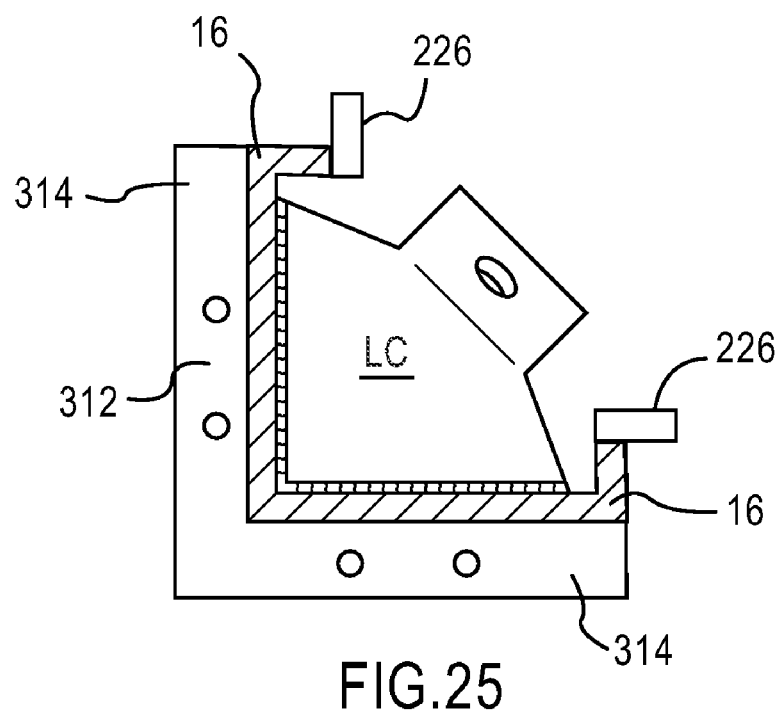
FIG. 25 is a top plan view partially in cross-section with the alternative mounting plate connected to the vertical support structure of the present invention.

Also, with reference to FIGS. 14, 15, 19 and 20, the vertical support structure 210 includes a pair of flat vertically-elongated support bars 224. Also, with reference to FIGS. 14, 15, 21 and 25, the vertical support structure 210 includes a pair of vertically-elongated end support bars 226 which extend along and perpendicularly from respective ones of the pair of support bars 224. Although not by way of limitation and as indicated in FIGS. 21 and 25, the end support bars 226 do not extend to the top of the vertical support structure 210 but terminate shortly therebefore, preferably, adjacent the slot 18. Each support bar 224 has a vertically-extending support bar inner edge 224i. Respective ones of the support bars 224 are connected to respective ones of the outside edges 16o of respective ones of the pair of panels 16. Although not by way of limitation, respective ones of the support bars 224 are connected to respective ones of the outside edges 16o of respective ones of the pair of panels 16 as an integral construction. Respective ones of the pair of support bars 224 are oriented perpendicularly, i.e., at a 90° angle A90 shown in FIG. 21, to the respective ones of the pair of panels 16 and towards the L-shaped channel LC. A skilled artisan would appreciate that respective ones of the pair of support bars 224 might be oriented approximately perpendicularly to the respective ones of the pair of panels 16 and towards the L-shaped channel LC without departing from the spirit and understanding of the invention.

Figure 19:
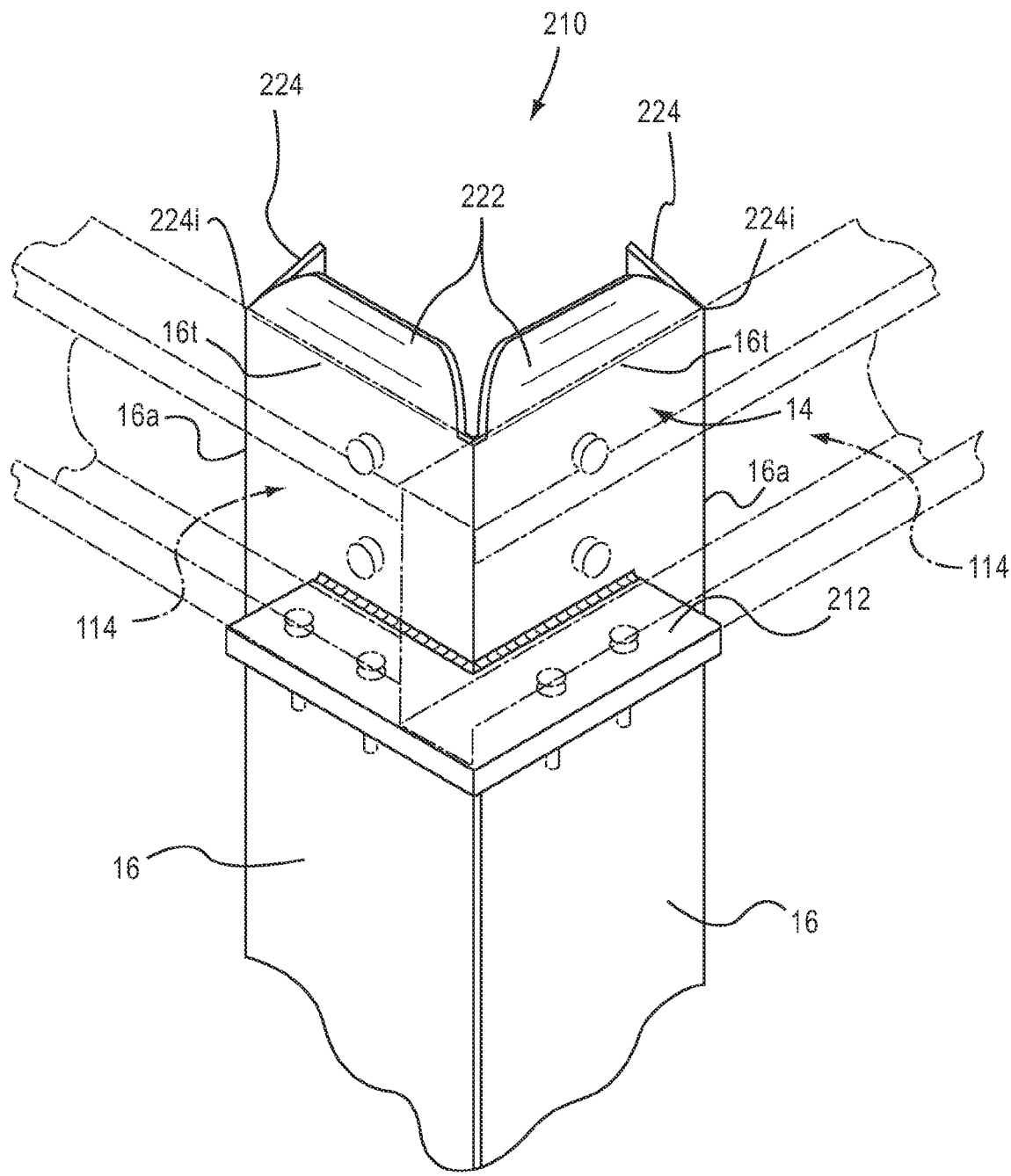
FIG. 19 is an enlarged partial perspective view of the vertical support structure in FIG. 14.

With reference to FIG. 19, the vertical support structure 210 of the present invention is adapted for use with two cross-beams 114 with the two cross-beams being oriented perpendicularly to each other. In short, the vertical support structure 210 as described hereinabove is used as a "corner" vertical support structure. However, a skilled artisan would appreciate that the vertical support structure 210 of the present invention can also be used for only a single cross-beam 114 as shown by way of example in FIG. 20 as a "center" vertical support structure disposed between two "corner" vertical support structures. As would be understood by a skilled artisan, a "center" vertical support structure might include only a single panel and not a pair of panels as described hereinabove. Thus, as a "center" vertical support structure, the vertical support structure is adapted for connecting a cross-beam 114 thereto. The cross-beam 114 has a flange 114c and a web 114d connected perpendicularly to the flange 114c. The flange 114c has at least one cross-beam flange hole 114b formed therethrough and the web 114d has at least one cross-beam web hole 114f formed therethrough. Although not by way of limitation, a height CBH of the cross-beam 114 is substantially equal to the distance D which, as described above, is the distance that the slot 18 is disposed away from the top edges 16t.

Again, with reference to FIG. 19 and 20, the vertical support structure 210 includes a plurality of fasteners in the form of conventional nuts 124a and conventional bolts 124b, in the support member 14 and the mounting plate 212 (or 12). The support member is in a form of an angle iron (see FIG. 10 or 21) to define the L-shaped channel LC and extends vertically along the vertical axis V and has the pair of vertically-elongated panels 16. Each panel 16 has the top edge 16t and the bottom edge 16b that are disposed vertically apart from and extend horizontally parallel to one another as described above.

In FIG. 19, the mounting plate 212 (or 12) is connected to at least one panel 16 between the top edge 16t and the bottom edge 16b. The mounting plate 212 (or 12) projects perpendicularly from the at least one panel 16 away from the L-shaped channel LC and extends horizontally parallel to the top and bottom edges 16t and 16b respectively. The mounting plate 212 (or 12) has at least one mounting plate hole 12h extending therethrough and the at least one panel 16 has at least one panel hole 16*h* formed therethrough. The at least one panel hole 16*h* is disposed between the mounting plate 212 (or 12) and the top edge 16*t* of the panel 16. When the cross-beam 114 rests on the mounting plate 212 (or 12), the at least one panel hole 16*h* and the at least one cross-beam web hole 114*f* correspond to each other and the at least one mounting plate hole 12*h* and the at least one cross-beam flange hole 114*b* correspond to each other so that respective ones of the fasteners, i.e. the conventional nuts 124*a* and the conventional bolts 124*b*, can extend therethough to connect the web 114*d* to the at least one panel 16 and to connect the cross-beam flange 114*c* to the mounting plate 212 (or 12).

Figure 22:
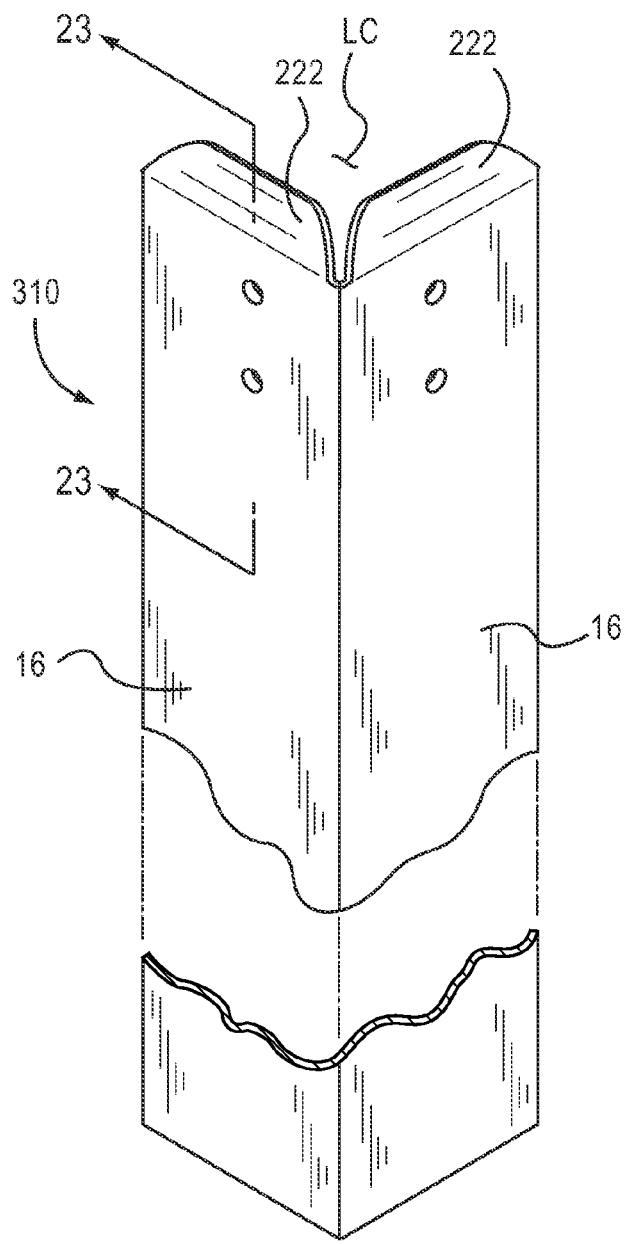
FIG. 22 is a perspective view of a third exemplary embodiment of a vertical support structure of the present invention that does not include a mounting plate.
Figure 23:
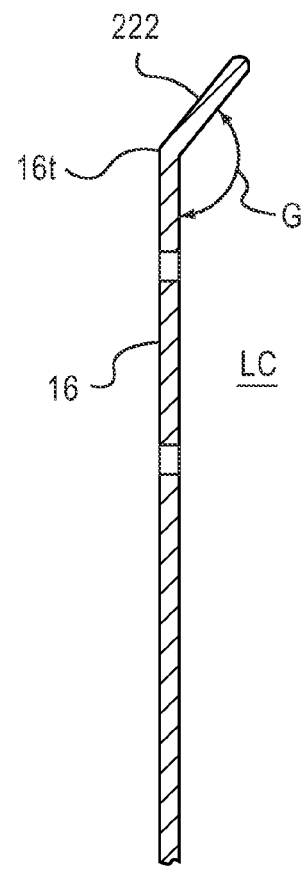
FIG. 23 is a partial cross-sectional view taken along line 23-23 in FIG. 22.

A third exemplary embodiment of a vertical support structure 310 of the present invention is generally introduced in FIGS. 22 and 23. The vertical support structure 310 is similar to the second exemplary embodiment of the vertical support structure 210 of the present invention except that the vertical support structure 310 does not include a mounting plate or the flat vertically-elongated support bars. No further discussion of the similar features is deemed necessary.

In FIG. 23, note that the guide element 222 is integrally connected to the top edge of the panel 16 and extends upwardly and inwardly toward the L-shaped channel LC at an angle G relative to the panel 16. The angle G is preferably 135° but may be in a range between approximately 110° and 160°. When a top section of the heat exchanger is mounted onto the bottom section thereof, the top section is lowered onto the bottom section. The guide elements, as part of the bottom section, guide the top section onto the bottom section as the top section is being lowered thereonto. Therefore, the vertical support structure of the present invention with the guide elements simplifies mounting of the top section of the heat exchanger to the bottom section thereof in a mated relationship.

Figure 24:
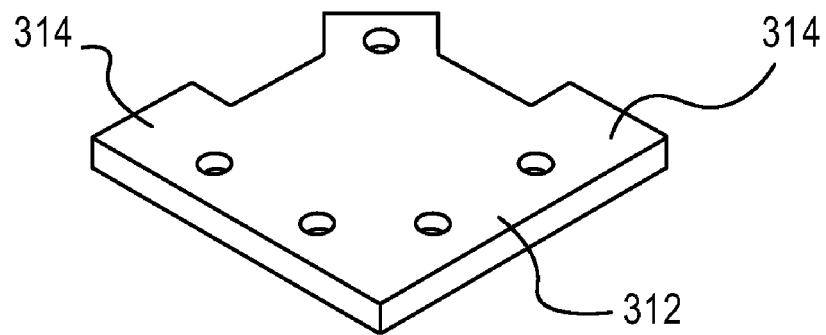
FIG. 24 is a perspective view of an alternative mounting plate for the vertical support structure of the present invention.

FIG. 24 depicts an alternative mounting plate 312 which is similar to the mounting plate 212 described above. The alternative mounting plate 312 includes a pair of stop elements 314. As illustrated in FIG. 25, the respective stop elements 314 are oriented on the mounting plate 312 to contact the respective panels 16 laterally adjacent to the slot 18 (FIG. 9) thereby preventing the mounting plate 312 from completely sliding through the slot 18.

For the present invention, the mounting plate and the support member are preferably fabricated from a stiff yet resilient material such as metal or resin. However, either the mounting plate or the support member can be fabricated from a stiff yet resilient material.

A skilled artisan would appreciate that the vertical support structure of the present invention reduces the shear $F_S$ and tension $F_T$ forces along with the bending moment $M_B$, generated during seismic events and/or in windy conditions, on the nuts and bolts fastening the flange of the cross-beam to the mounting plate by redistributing the load away from the nuts and bolts, directly into the vertical support structure. Also, a skilled artisan would appreciate that the vertical support structure of the present invention provides enhanced support for cross-beams in a heat exchanger as a result of the vertical support structure itself providing joint stiffness that carries some of the load directly rather than the nuts and bolts carrying all of the load as in the prior art described above.

The present invention, may, however, be embodied in various different forms and should not be construed as limited to the exemplary embodiments set forth herein; rather, these exemplary embodiments are provided so that this disclosure will be thorough and complete and will fully convey the scope of the present invention to those skilled in the art.

What is claimed is:

1. A vertical support structure, comprising:
a mounting plate; and
a support member extending vertically along a vertical axis and having a pair of vertically-elongated panels, each panel having an inside edge, an outside edge, a top edge and a bottom edge, the inside edge and the outside edge disposed horizontally apart from and extending vertically parallel to one another, the top edge and the bottom edge disposed vertically apart from and extending horizontally parallel to one another, the pair of panels connected to each other along respective inside edges to form a generally L-shaped configuration as viewed in cross-section thereby defining a vertically-extending apex and a vertically-extending L-shaped channel, the support member having a slot formed therethrough, the slot disposed between respective ones of the top and bottom edges and extending horizontally between respective ones of the outside edges and through the apex,
wherein the slot is sized to slidably receive the mounting plate and the mounting plate occupying the slot is connected to the support member such that the mounting plate projects perpendicularly from the support member and away from the L-shaped channel and
wherein each one of the pair of panels includes at least one panel hole extending therethrough and disposed between the slot and the top edge.

2. A vertical support structure according to claim 1, wherein the slot is disposed away from yet adjacent to the respective ones of the top edges.

3. A vertical support structure according to claim 1, wherein at least one of the mounting plate and the support member is fabricated from a stiff yet resilient material.

4. A vertical support structure according to claim 1, wherein the pair of panels are connected to each other along respective inside edges to form an integral construction.

5. A vertical support structure according to claim 1, wherein the mounting plate is V-shaped as viewed in plan view.

6. A vertical support structure according to claim 1, wherein the mounting plate is connected to the support member by at least one weldment.

7. A vertical support structure according to claim 1, wherein the mounting plate has a plurality of serially-connected mounting plate sides forming a shape of a polygon.

8. A vertical support structure according to claim 7, wherein the mounting plate is formed as a pentagon.

9. A vertical support structure according to claim 8, wherein the pentagon is non-cyclic and non-equilateral.

10. A vertical support structure, comprising:
a mounting plate having a plurality of serially-connected mounting plate sides forming a shape of a polygon;
a support member extending vertically along a vertical axis and having a pair of vertically-elongated panels, each panel having an inside edge, an outside edge, a top edge and a bottom edge, the inside edge and the outside edge disposed horizontally apart from and extending vertically parallel to one another, the top edge and the bottom edge disposed vertically apart from and extending horizontally parallel to one another, the pair of panels connected to each other along respective inside edges to form a generally L-shaped configuration as viewed in cross-section thereby defining a vertically-extending apex and a vertically-extending L-shaped channel, the support member having a slot formed therethrough, the slot disposed between respective ones of the top and bottom edges and extending horizontally between respective ones of the outside edges and through the apex; and a tab element connected to the mounting plate and extending along one of the mounting plate sides, the tab element oriented at a downwardly angle from the mounting plate and angling downwardly towards the bottom edges, wherein the slot is sized to slidably receive the mounting plate and the mounting plate occupying the slot is connected to the support member such that the mounting plate projects perpendicularly from the support member and away from the L-shaped channel.

11. A vertical support structure according to claim 10, wherein the tab element has a tab element hole formed therethrough.

12. A vertical support structure according to claim 1, further comprising a pair of guide elements, respective ones of the pair of guide elements being integrally connected to respective ones of the top edges of the panels and extending upwardly and inwardly toward the L-shaped channel.

13. A vertical support structure according to claim 1, further comprising a pair of flat vertically-elongated support bars, each support bar having a vertically-extending support bar inner edge, respective ones of the support bars being connected to respective ones of the outside edges of respective ones of the pair of panels, respective ones of the pair of support bars being oriented perpendicularly to the respective ones of the pair of panels towards the L-shaped channel.

14. A vertical support structure according to claim 1, wherein the slot is sized to slidably receive the mounting plate in a close-fitting manner.

15. A vertical support structure adapted for connecting a cross-beam thereto, the cross-beam having a flange and a web connected perpendicularly to the flange with the flange having at least one cross-beam flange hole formed therethrough and the web having at least one cross-beam web hole formed therethrough, the vertical support structure comprising:

a plurality of fasteners;

a support member in a form of an angle iron to define an L-shaped channel and extending vertically along a vertical axis and having a pair of vertically-elongated panels, each panel having a top edge and a bottom edge disposed vertically apart from and extending horizontally parallel to one another; and a mounting plate connected to at least one panel between the top and bottom edges, the mounting plate projecting perpendicularly from the at least one panel away from the L-shaped channel and extending horizontally parallel to the top and bottom edges, the mounting plate having at least one mounting plate hole extending therethrough, wherein the at least one panel has at least one panel hole formed therethrough, the at least one panel hole disposed between the mounting plate and the top edge such that, when the cross-beam rests on the mounting plate, the at least one panel hole and the at least one cross-beam web hole correspond to each other and the at least one mounting plate hole and the at least one cross-beam flange hole correspond to each other so that respective ones of the fasteners can extend therethough to connect the web to the at least one panel and to connect the flange to the mounting plate.

16. A vertical support structure, comprising:

a support member extending vertically along a vertical axis and having a pair of vertically-elongated panels, each panel having an inside edge, an outside edge, a top edge and a bottom edge, the inside edge and the outside edge disposed horizontally apart from and extending vertically parallel to one another, the top edge and the bottom edge disposed vertically apart from and extending horizontally parallel to one another, the pair of panels connected to each other along respective inside edges to form a generally L-shaped configuration as viewed in cross-section thereby defining a vertically-extending apex and a vertically-extending L-shaped channel, and a pair of guide elements, respective ones of the pair of guide elements being integrally connected to respective ones of the top edges of the panels and extending upwardly and inwardly toward the L-shaped channel, wherein the support member has a slot formed therethrough, the slot disposed between respective ones of the top and bottom edges and extending horizontally between respective ones of the outside edges and through the apex and wherein each one of the pair of panels includes at least one panel hole extending therethrough and disposed between the slot and the top edge.

17. A vertical support structure according to claim 16, wherein the support member has a slot formed therethrough, the slot being disposed between respective ones of the top and bottom edges and extending horizontally between respective ones of the outside edges and through the apex.

18. A vertical support structure according to claim 17, further comprising a mounting plate and wherein the slot is sized to slidably receive the mounting plate and the mounting plate occupying the slot is connected to the support member such that the mounting plate projects perpendicularly from the support member and away from the L-shaped channel.

19. A vertical support structure, comprising:

a mounting plate;

a pair of guide elements; and a support member extending vertically along a vertical axis and having a pair of vertically-elongated panels, each panel having an inside edge, an outside edge, a top edge and a bottom edge, the inside edge and the outside edge disposed horizontally apart from and extending vertically parallel to one another, the top edge and the bottom edge disposed vertically apart from and extending horizontally parallel to one another, the pair of panels connected to each other along respective inside edges to form a generally L-shaped configuration as viewed in cross-section thereby defining a vertically-extending apex and a vertically-extending L-shaped channel, the support member having a slot formed therethrough, the slot disposed between respective ones of the top and bottom edges and extending horizontally between respective ones of the outside edges and through the apex, wherein the slot is sized to slidably receive the mounting plate and the mounting plate occupying the slot is connected to the support member such that the mounting plate projects perpendicularly from the support member and away from the L-shaped channel, wherein respective ones of the pair of guide elements are connected to respective ones of the top edges of the panels and extend upwardly and inwardly toward the L-shaped channel and wherein each one of the pair of panels includes at least one panel hole extending therethrough and disposed between the slot and the top edge.

* * * * *